FIG. 6 – PRIOR ART

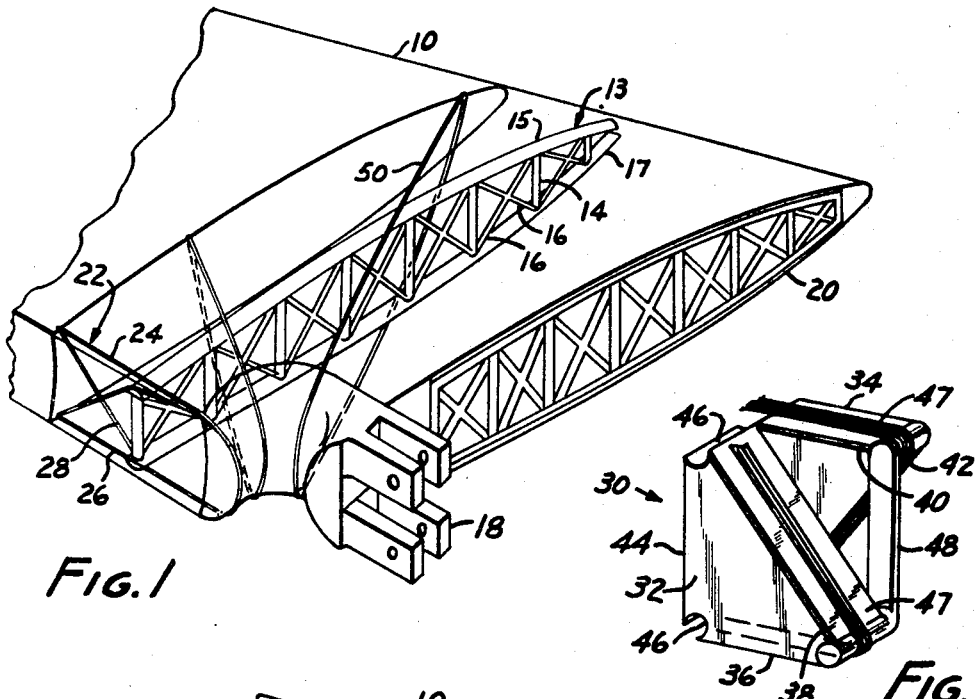
Fig. 1
Fig. 4
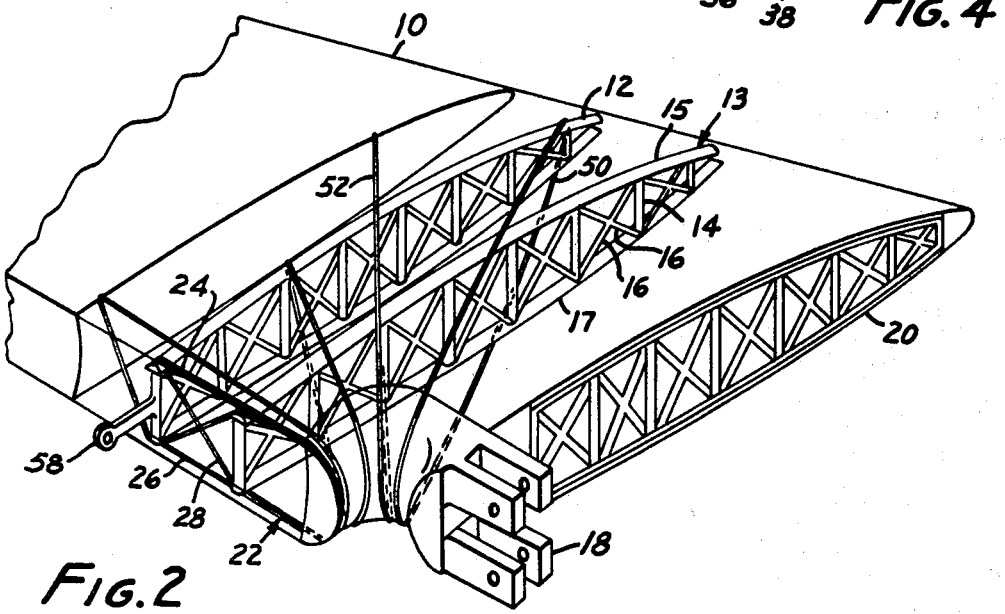
Fig. 2
ROBERT E. PARSONS,
FRED J. DARMS,
WILLIAM T. COX
INVENTORS.
BY
ATTORNEYS.

ROBERT E. PARSONS,
FRED J. DARMS,
WILLIAM T. COX
INVENTORS

BY
ATTORNEYS.

United States Patent Office 3,436,038
Patented Apr. 1, 1969

3,436,038
STRUCTURES
Robert E. Parsons, West Covina, Fred J. Darms, Upland, and William T. Cox, Pomona, Calif., assignors to Aerojet-General Corporation, El Monte, Calif., a corporation of Ohio
Filed Apr. 11, 1967, Ser. No. 630,116
Int. Cl. B64c 3/18, 1/26, 3/26
U.S. Cl. 244—123    10 Claims

ABSTRACT OF THE DISCLOSURE

This invention relates to structural members such as spars for aircraft wings and the like.

According to the present invention a structure is provided, such as an aircraft wing, having one or more fittings by which the structure is to be supported by another structure, such as a fuselage. A plurality of structural members such as spars are connected to each fitting and radiate therefrom throughout the structure.

According to a preferred but optional feature of this invention the structural members connect with several other structural members, such as ribs, and include diagonal members formed between the ribs and the spars. The structural members radiated from the fitting may be continuously-wound filament rovings, and another feature is to decrease the number of rovings in the structural members as they recede from the fitting. The particular configuration of radiation provides an isotensoid support for the structure.

---

This invention relates to structural members such as spars for aircraft wings and the like.

Heretofore the structural array of an aircraft wing framework has comprised a plurality of ribs and a plurality of spars perpendicular to each other. The problem with such designs is that a load located at a particular point on the aircraft wing creates a force which must be transferred longitudinally and latitudinally along the ribs and spars to the support point or points for the wing. These forces, when combined with forces from other load points, create substantial forces in certain ones of the ribs and spars, thereby requiring relatively strong ribs and spars to support the forces.

An object of the present invention is to provide a structure having a network of ribs and spars in a design such that forces are directed towards the support point in a substantially linear direction.

Another object of the present invention is to provide a plurality of continuously-wound radiating spar sections in a planar pattern. The term "planar pattern" as used herein means a pattern of structural members so disposed and arranged throughout a structure so that each member is in a single plane. The number and placement of members in the pattern may be mathematically determined in accordance with the strength requirements of the structure.

Still another object of the present invention is to provide continuously-wound spars having portions of greater strength than other portions in order that the spar may support loads in a substantially isotensoid stress pattern. The term "isotensoid stress pattern" as used herein means a pattern wherein substantially equal stress levels are maintained on the members within the structure.

According to the present invention a framework is provided having a support point and a plurality of spars radiating from the support point in different directions. The dispersion of the radiated spars is such as to provide increased strength-to-weight ratios of frameworks than heretofore known.

A preferred but optional feature of this invention is the provision of radiating spars constructed from bonded resin-impregnated continuously-wound filament rovings.

Another preferred but optional feature of this invention is the provision of a segmented mandrel whereby a spar may be continuously wound having portions of greater strength than other portions.

The above and other features of this invention will be fully understood from the following detailed description and the accompanying drawings, in which:

FIGS. 1 and 2 are cutaway perspective views of an aircraft wing according to the presently preferred embodiment of the present invention;

FIG. 4 is a perspective view of a mandrel used for forming the structure illustrated in FIGS. 1 and 2;

FIG. 6 is a top elevation of an aircraft wing as known in prior art.

Figure 5:
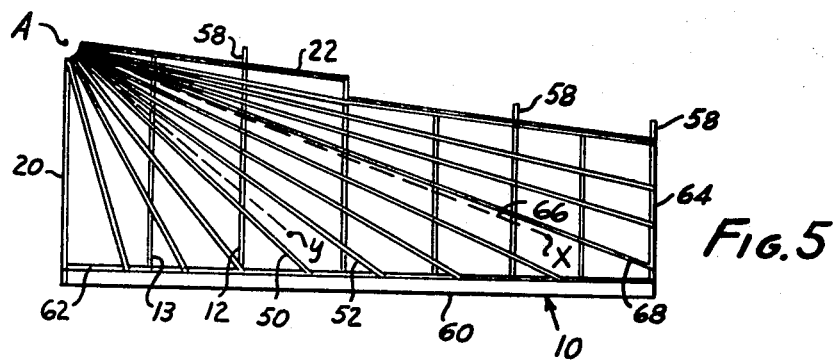
FIG. 5 is a top elevation of an aircraft wing formed in accordance with the present invention.

Referring to FIGS. 1–4 there is illustrated an aircraft wing 10 having a plurality of preformed ribs such as 12 and 13. The ribs, which are preferably constructed from glass filament rovings, preferably comprise vertical members 14, diagonal members 16 and upper and lower rib caps 15 and 17, respectively. Support fitting 18 is fastened or integrally connected with the end rib 20 and is adapted to be fastened into the fuselage of an aircraft so that rib 20 is supported along the side of the fuselage. Fitting 18 may, for example, be constructed from random filament rovings to assure proper bonding to rib 20 as well as to the spars. Although only one fitting 18 is illustrated, it is to be understood that one or more such fittings may provide support for the wing.

A plurality of spars such as spar 22 are formed by winding filament rovings about fitting 18 and the ribs in an isotensoid manner. Each spar comprises an upper spar cap 24 and a lower spar cap 26. A plurality of diagonal members 28 interconnect the upper spar caps and the lower spar caps between each rib. Any number of spars may be used, but one feature of this invention is that the spars radiate from the support point of the aircraft wing. The number of spars used will, of course, depend upon the strength requirements of the aircraft wing.

Figure 3:
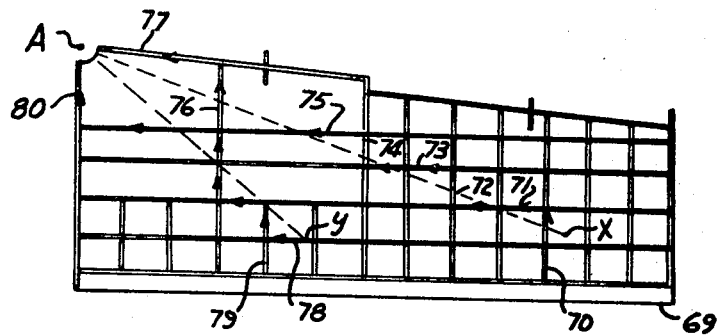
FIG. 3 is a greatly enlarged side view of a portion of FIGS. 1 and 2.
Figure 3:
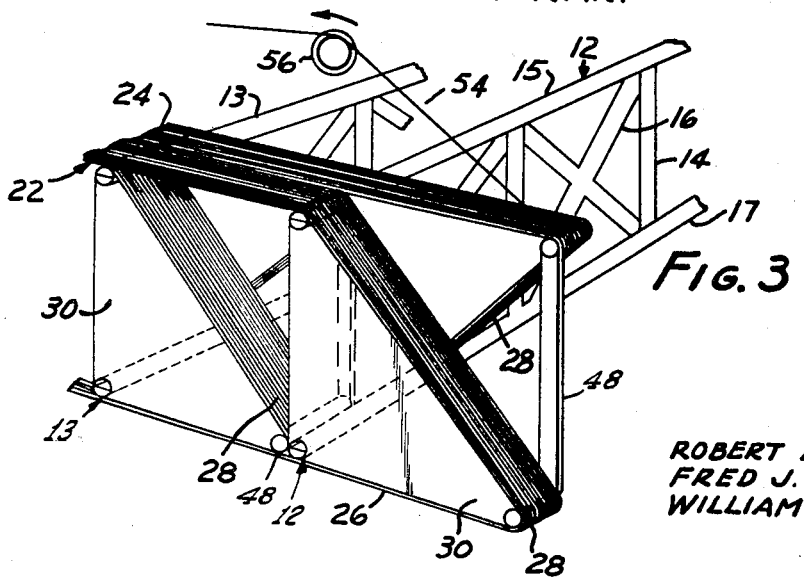

FIGS. 3 and 4 illustrate the method used to construct spars 22 along with the diagonal members 28. End rib 20 is fastened to fitting 18, and a rib 13 is spaced from end rib 20. For example, fitting 18 may be constructed from randomly-oriented resin-impregnated filament rovings and may be resin-bonded to rib 20. Mandrel 30 is placed adjacent rib 13.

Mandrel 30 comprises a pair of substantially triangular shaped mandrel segments 32 and 34. Segment 32 has a lower face 36 for forming lower spar cap 26, and a diagonal face 38 for forming one diagonal member 28; and mandrel segment 34 has a top face 40 for forming upper spar cap 24 and a diagonal face 42 for forming the other diagonal member 28. A third face 44 on each of mandrel segments 32 and 34 is intended to be placed adjacent a rib during the construction of the spars. Recesses 46 may be provided in mandrel segments 32 and 34 to accommodate the upper and lower rib caps of the ribs. A double-legged fitting 48 is fitted into suitable recesses on each of mandrel segments 32 and 34 at the junction between faces 36 and 38 and faces 40 and 42.

Although mandrel 30 is illustrated in FIGS. 3 and 4 as being substantially perpendicular to rib 12 for formation of spar 22, it is to be understood that other mandrels having a shape skew to the plane of the ribs may be provided for the formation of other spars, such as spars 50 and 52.

Construction of the radiating spars will now be described with particular reference to FIG. 3. Ribs 12, 13 and 20 are pre-formed to any suitable design in accordance with structural requirements of the wing 10. By way of example, the ribs may be constructed from filament rovings impregnated with a suitable resin and cured prior to assembly with the spars. Fitting 18 is pre-attached to end section 20. If desired, a suitable mandrel may be placed against end rib 20 and fitting 18 so as to provide diagonal members between ribs 13 and 20. Alternatively, ribs 13 and 20 may be jigged so as to support the spars as well as the skin of the aircraft wing in a later operation.

Mandrel 30, such as illustrated in FIG. 4, is placed against rib 13 so that recesses 46 are fitted with the upper and lower rib caps of rib 13. Faces 36, 38, 40 and 42 of the mandrel are covered with a suitable release film 47, such as Aclar release film, available from Allied Chemical Company, Los Angeles, California. The release film may if desired be applied to the segments prior to the assembly of the mandrel to assure proper coating of the faces. The mandrel and release film may be heated prior to filament winding to remove impurities from the film and mandrel and to harden the film to provide a rigid contact layer for the filament rovings.

A continuous filament roving 54 is guided by payoff head 56 to continuously wind the roving over fitting 18 and mandrel 30 to form a portion of the upper spar cap 24, the lower spar cap 26 and the diagonal members 28 intended to be formed between ribs 13 and 12.

After several windings of payoff head 56 about the structure, several layers of filament roving 54 will have been wound about fitting 18 and mandrel 30. When a suitable number of rovings has been wound, rib 12 is placed against the structure and another mandrel is placed against rib 12 in the same manner that mandrel 30 was placed against rib 13. The roving 54 is then continuously wound over both mandrels to form more of the upper and lower spar caps as well as additional diagonal members 28 intended to be placed between rib 12 and the next rib.

It is to be understood that the winding of roving 54 to form the spars is continuous so that roving 54 need not be cut as additional mandrels are placed against additional ribs. By way of example, payoff head 56 may be stopped in the position illustrated in FIG. 3 so that the payoff head does not interfere with the right side (as shown in FIG. 3) of mandrel 30. An additional rib (not shown) and mandrel (not shown) may then be placed against the free side of mandrel 30, and the payoff head may then be rotated about the entire structure as indicated by the arrow to wind filament rovings over the rib and new mandrel 30 in the manner hereinbefore described. In this manner, mandrels 30 are placed between successive rib structures to "grow" the spars, and the filament rovings forming the upper and lower spar caps 24 and 26 and diagonal members 28 of spar 22 may be continuously wound.

Roving 54 is preferably impregnated with a bonding thermosetting resin, such as an epoxy resin, before or during the winding operation. The thermosetting, resin-impregnated roving is cured by subjecting the structure and mandrel to heat for a sufficient length of time to cure the resin. Thermosetting resins which are curable by other chemical or physical means such as radiation or curing catalysts, may be used if desired. As one example, the uncured structure may be heated to 250–300° F. for a period of about four to six hours to obtain a complete cure. The temperature and length of time necessary to obtain a complete cure is dependent upon the size of the rovings and the type of resin used. One example of a suitable resin-impregnated roving is a glass filament roving, sold commercially by Owens Corning Company as "S901" roving, and impregnated with resin commercially available from U.S. Polymetric, Inc. as "E787." Other rovings may be used, and the choice depends upon particular strength factors to be satisfied as well as other factors. As examples of filament rovings, graphite yarns, boron fibers, beryllium wire, silicon carbide, aluminum boron silicate and beryllium glass filaments may be used.

When the resin on filament rovings 54 is cured, the resin will bond the spars to the ribs and to the fitting, thereby rigidly bonding the entire structure together. The upper and lower spar caps are therefore connected to the upper and lower rib caps of the ribs, and each diagonal member 28 has one end connected to the junction of an upper spar cap and an upper rib cap, and the other end connected to the junction of the lower spar cap of the same spar and the lower rib cap of the next rib.

After the wing structure is cured, mandrel 30 may be removed by removing fittings 48 and mandrel segments 32 and 34. A wing skin may then be formed over the structural member to complete fabrication of the wing. Mandrel segments 32 and 34 and fitting 48 may then be prepared for construction of another wing assembly.

FIG. 5 illustrates a top elevation of an aircraft wing formed in accordance with the present invention. FIG. 6 is a top elevation of a prior art aircraft wing, shown to illustrate the distinction from FIG. 5. In FIG. 5, fitting 18 for attachment to the fuselage has been omitted, but point A represents the support point for wing 10. Fittings 58 are attached to suitable ribs such as 12, for support of the ailerons (not shown), and leading edge cap 60 is attached to spar 62 and end rib 20.

The spars radiate from support point A and are bonded to the support fitting and to either spar 62 or end rib 64. The spars are wound over the support fitting and closing spar 62 or rib 64, and are resin-bonded thereto. The number of radiating spars necessary is predetermined in accordance with strength factors required for the aircraft wing and in accordance with the number of rovings in each spar. The spars have greater strength nearer the support fitting than at locations more remote from the fitting due to the sectioning of the mandrel between each rib and the "growing" of the spars and the associated overlapping filament windings on the inboard end of the spars.

The radial dispersement of the spars creates an isotensoid pattern of spars so that stress forces appearing at any location in the wing are substantially linearly directed towards support point A along a radial spar. Thus, a force appearing at point X is transmitted directly to support point A via spar 68, which is in close proximity with dashed line 66, thereby providing a linear support for the force. Likewise, a force at point Y is divided between spars 50 and 52 and is directed linearly to support point A. The radial spar thus reacts to forces on the structure with substantialy only compression and tension stresses, and the radial spars are so disposed and arranged as to support substantially equal loads.

Conversely, in prior art structures of aircraft wings, such as illustrated in FIG. 6 having substantially perpendicular ribs and spars, a force at point X is directed over rib 70, spar 71, rib 72, spar 73, rib 74, spar 75, rib 76, and spar 77. Likewise, a force at point Y is directed essentially over spar 78, rib 79, spar 70, rib 76, spar 75, and rib 80. It is to be understood that this is a simplified description of the dispersement of the forces through the prior art type of rib and spar structure, since each force is dispersed both latitudinally and longitudinally at the junction of each rib and spar so to be dispersed through the entire wing structure.

The disadvantage of the arrangement illustrated in FIG. 6 is that the ribs and spars must be strong enough to support torsional loads from various points on the wing, not necessarily in line between that point and the support point, and the ribs must transfer forces from spar to spar. With an isotensoid arrangement as illustrated in FIG. 5, the forces are directed substantially linearly toward the support point A over a single spar, or divided between two spars, and the ribs only transmit forces to an adjacent spar. Other spars are not affected by the force and are free to support other forces. The ribs need not be as strong as prior structures since they only transmit stresses to adjacent spars and are not subjected to as substantial torsional loads as in prior structures. Since the strength requirements necessary for the ribs and spars are reduced, they may be of less weight than heretofore used, and the strength-to-weight factor may be increased.

The present invention thus provides continuously wound filament roving structural members having a planar pattern to provide greater strength-to-weight ratios. The "growing" of the mandrel for forming the isotensoid structure is advantageous since greater strength may be had in portions closest to the support to thereby insure sufficient strength of the structure, thereby increasing the strength-to-weight ratio of the structure.

It is to be understod that although the present invention is described in detail with respect to the construction of an aircraft wing, the principles of the present invention may be incorporated in the construction of any type of structural member, for example an aircraft fuselage, a ship hull, or even the structural form of certain buildings.

We claim:

1. A structure having a fitting adapted to support the structure; a plurality of first support members connected to the fitting and radiating therefrom; a plurality of second support members, each of said second support members being located substantially parallel to each other and in spaced relation; each of said first members having first upper and lower caps located in spaced relation from each other and each of said second members having second upper and lower caps located in spaced relation from each other, the upper cap of at least one of said first support members being joined to the upper caps of at least two adjacent second support members and the lower cap of said one first support member being joined to the lower caps of at least said two adjacent second support members, and a diagonal member integral with said one first support member joined to adjacent second support members and having one terminus at the junction of the upper cap of said one first support member and the upper cap of one of said second support members and having another terminus at the junction of the lower cap of said one first support member and the lower cap of the other of the adjacent second support members.

2. A structure according to claim 1 wherein the first support members are arranged in an isotensoid pattern.

3. A structure according to claim 1 wherein each of said first support members is formed with a bonded resin-impregnated continuously-wound filament roving.

4. A structure according to claim 3 wherein the number of filament rovings in each of the first support members decreases at the intersection of each second support member as the first support member recedes from the fitting.

5. A structure according to claim 4 wherein the first support members are arranged in an isotensoid pattern.

6. A spar configuration for a wing structure having a plurality of substantially parallel aligned ribs in spaced relation, each having an upper and lower rib cap located in spaced relation from each other, and a fitting connected to said wing structure adapted to be connected to the fuselage of a craft and to support the wing structure, said spar configuration comprising: a plurality of spars connected to the fitting and radiating therefrom throughout the structure, each of said spars having upper and lower spar caps located in spaced relation from each other, the upper spare cap of at least one of said spars being joined to the upper rib cap of at least two adjacent ribs and the lower spar cap of said one spar being joined to the lower rib caps of at least said two adjacent ribs, and a diagonal member integral with said one spar joined to adjacent ribs and having one terminus at the junction of the upper spar cap of said one spar and the upper rib cap of one of the ribs and having another terminus at the junction of the lower spar cap of said one spar and the lower rib cap of the other of the adjacent ribs.

7. A spar configuration according to claim 6 wherein the spars are arranged in an isotensoid pattern.

8. A spar configuration according to claim 6 wherein each spar is formed by a bonded resin-impregnated continuously-wound filament roving.

9. A spar configuration according to claim 8 wherein the number of filament rovings in each spar decreases at the intersection of a rib as the spar recedes from the fitting.

10. A spar configuration according to claim 9 wherein the spars are arranged in an isotensoid pattern.

References Cited

UNITED STATES PATENTS

| | | | |
|---|---|---|---|
| 1,809,913 | 6/1931 | Semmes | 244—123 |
| 2,410,056 | 10/1946 | Fresco | 244—123 |
| 2,593,714 | 4/1952 | Robinson | 244—123 |
| 2,749,061 | 6/1956 | Franz | 244—123 |
| 3,101,121 | 8/1963 | MacNeal | 244—123 |
| 3,273,833 | 9/1966 | Windecker | 244—124 |

MILTON BUCHLER, *Primary Examiner.*

T. W. BUCKMAN, *Assistant Examiner.*